Patented Nov. 25, 1924.

1,516,552

UNITED STATES PATENT OFFICE.

ARTHUR STOLL AND EMIL SUTER, OF BASEL, SWITZERLAND, ASSIGNORS TO THE SOCIETY CHEMICAL WORKS FORMERLY SANDOZ, OF BASEL, SWITZERLAND.

HEART-AFFECTING PURE GLUCOSIDE FROM BULBUS SCILLÆ AND A PROCESS FOR PRODUCING THE SAME.

No Drawing.   Application filed June 8, 1923.   Serial No. 644,238.

*To all whom it may concern:*

Be it known that we, ARTHUR STOLL and EMIL SUTER, both citizens of the Swiss Republic, and residents of Basel, Switzerland, have invented a new and useful Heart-Affecting Pure Glucoside from Bulbus Scillæ and a Process for Producing the Same, of which the following is a full, clear, and exact specification.

The object of the present invention is the production of a heart-affecting glucoside in pure state from squill (bulbus Scillæ-bulb of *Urginea maritima* (L) Baker). The pure substance has, besides its exact dosing property, the further advantage over the raw drug, which is of fluctuating strength in its action, in that it can be injected and has lesser irritation on the tissue.

Extracts are used as a raw-material, which are obtained in the known way with organic solvents of small water content, such as alcohol or methyl alcohol, by extractions to exhaustion of powdered squills. These extracts contain together with the active material a large quantity of subsidiary materials, from which the glucoside is first separated by the action of tannin precipitating or refining substances, for instance, lead acetate or sugar of lead, zinc acetate, aluminium hydroxide, and then by separating between a watery solution and a suitable organic solvent which will not mix with water, such as chloroform or acetic ester, whereby the glucoside passes over from the watery phase in a very high percentage form into the organic solvent used for extraction. Without the above treatment with tannin precipitating or refining substances, a dark colored oily product would pass over into the extraction solution. The passing over of the glucoside from the watery solution is aided by concentrating the same in vacuo, by the addition of common salt to the watery phase and by the addition of up to 10 per cent methyl- or ethyl-alcohol to the organic extracting solution. This renders the passing over of the glucoside from the watery phase, for instance, into chloroform technically considerably more efficacious and it could not be foreseen, that this operation should be successful, because the scilla glucoside in contradistinction to many other cardiac glucosides, which are similarly obtained, is relatively easily soluble in water, but is only soluble with great difficulty in chloroform. For the separation of a small residue of the secondary substances the glucoside is passed out of the organic solvent (for instance, chloroform) by shaking up with a sufficient amount of pure water. The sugar-free division product of the glucoside possibly mixed herewith the glucoside basis always remains behind in the organic solvent by this shaking up. In practice, the organic solvent (for instance, chloroform) rendered once more free of glucoside by the agitation with water, can always be used again for a new agitation or extraction of the watery raw glucoside solution until it is exhausted of the same. By evaporation of the united pure watery extract solutions to dryness in vacuo at a low temperature, the pure glucoside is obtained in solid form.

The above separation of the secondary substances with tannin precipitating or refining substances is performed more advantageously in a water-containing organic solvent, for instance, in 40 per cent alcohol, than in pure watery solution.

In an abbreviated process the greater part of the pure glucoside can be separated, if from convenient glucoside extracts as first material a large quantity of gummy like secondary substances free from glucoside is removed by taking up the raw material in methylalcohol and the like and precipitating with ether, then concentrating the solution again to dryness and dissolving in water or water containing alcohol and afterwards only carrying out the process with tannin precipitating or refining substances on the product. The most part of the pure glucoside separates itself from the solution so purified by concentrating in vacuo at a low temperature; it forms, filtered off and briefly washed with cold water, a fine granular white powder.

The process is thus based upon the feature that the extracts, which are obtained in the known way by exhaustive extraction with a suitable organic solvent of small water content from powdered squill rich in glucoside, are dissolved in water or water containing organic solvents, the solution mixed with tannin precipitating or refining substances as long as a precipitate results, then filtered from the precipitate, and thereupon the surplus tannin precipitating or refining substance remaining is again removed from the filtrate. The glucoside solution so purified is either immediately, or preferably having first been brought to a small volume by concentration in vacuo at a low temperature and mixed with common salt, shaken up with a suitable organic solvent which will not mix with water to which is added up to 10 per cent in volume of an organic solvent which can be mixed with water. The glucoside is passed over from the organic solvent by shaking up with a sufficient quantity of water again into the same and is obtained in solid form by concentrating the watery solution to dryness in vacuo at a low temperature. For many purposes, the concentration of the watery glucoside solution can be omitted, if glucoside content is tested by experiment and the usual relatively concentrated solution is adjusted by dilution to the concentration of the solutions ready for use. By a partial precipitation with ether of the secondary substances from the methyl alcohol solution of raw extract and subsequent purification with tannin precipitating or refining substances in the abbreviated process a separation of the pure glucoside from the concentrated watery solution is produced before the agitation with chloroform and the like.

The pure glucoside from the squill consists of a white to pale yellow powder free from ash, which even in a concentrated solution, does not reduce Fehling's solution; it possesses a high physiological efficacy; 1 mg. of the substance gives according to the Frog standard of Houghton-Straub 1200 to 1300 Frog doses (F.—D.). At a higher temperature in a pure watery solution at 60 to 70°, the efficacy of the glucoside decreases considerably after a short time. Dilute watery acids hydrolize the glucoside even in the cold into sugar which will reduce Fehling's solution and a crystallized division product almost insoluble in water.

*Example 1.*

50 gm. of a dried alcoholic extract of powdered bulbus Scillæ are dissolved in 2.5 liters of water. The solution is mixed with 50 c. cm. of plumbum subaceticum duplex, filtered and the precipitate washed with 1 liter of water. The filtrate is treated with 50 c. cm. of a tepid 30 per cent by weight solution of di-sodium phosphate to be freed from lead. This is again filtered and the precipitate is washed with 1 liter of water. The filtrate is concentrated in vacuo below 30° to 250 c. cm. and the solution saturated with common salt.

The solution of glucoside is now shaken up with 2 liters of chloroform—10% methyl alcohol; the chloroform-methyl alcohol solution is dried with anhydrous sodium sulfate, filtered and the glucoside taken out of the solution by twice-repeated shaking up with about 250 c. cm. of water. The chloroform liquor free from glucoside is enriched by the addition of chloroform and methyl alcohol to the volume of 2 liters and used for a further shaking up of the watery glucoside solution and so on. After shaking up seven times with 2 liters of chloroform—10% methyl alcohol the solution is free from active glucoside. The united watery solutions of shaking up (3.5 liters) are concentrated to dryness in vacuo below 30°; to concentrate the substance and to dry it more easily the residue is taken up in a little methyl alcohol, the solvent is distilled off again and the glucoside is dried in the desiccator. It is a white to pale-yellow powder free from ash, which does not reduce Fehling's solution and is of high pharmacopical efficacy: 1 mg. of the substance gives according to the method settled by Houghton-Straub a physiological efficacy of 1200 to 1300 Frog doses (F.—D.). At a higher temperature in a pure water solution at 60–70° the efficacy of the glucoside decreases substantially after a short time. The glucoside even in the cold state is easily hydrolized by dilute watery acids, whereby the sugarless division product partly separates itself from the dilute solution, in well shaped prisms. The mother liquor filtered therefrom reduces strongly Fehling's solution. The crystals of the sugarless division product are easily soluble in chloroform and glacial acetic acid, moderately in boiling alcohol and methyl alcohol, almost insoluble in water. From alcohol the substance crystallizes in magnificent colorless columns, which, when dried in a high vacuum at 105° to constant weight, contain 78.2 per cent of carbon and 8.0 per cent of hydrogen. By heating, it turns to a yellow and red color below its melting point; at about 240° it becomes a molten red mass.

*Example 2.*

20 gm. of a dried alcoholic extract of powdered bulbus Scillæ are dissolved in 2 liters of water. To the solution are added 30 c. cm. of a solution of 25 per cent by weight of zinc acetate, filtered and the precipitate washed with 500 c. cm. of water. The filtrate is treated with 25 c. cm. of a tepid 30 per cent by weight solution of di-sodium phosphate to be freed from zinc. The precipitate is filtered off and washed with 400 c. cm. of water. The filtrate is concentrated in vacuo to 200 c. cm. and the concentrated solution saturated with common salt. The glucoside solution is now shaken up with 1 liter of a mixture of chloroform—5 volume per cent methyl alcohol, the product obtained by the agitation is dried over anhydrous sodium sulfate, poured off therefrom and the filtrate twice extracted with each time 125 c. cm. of water. The chloroform liquor is enriched by the addition of chloroform and methyl alcohol to 1 liter of chloroform—5% methyl alcohol and used again for the extraction of glucoside solution, as above described. After shaking up eight times with 1 liter of chloroform—5% methyl alcohol, the common salt saturated watery solution will be free from active glucoside.

The united watery solutions of pure glucoside (2 liters) are concentrated to dryness in vacuo, the residue is taken up in a little methyl alcohol, the solvent is distilled off again and the glucoside is dried in a vacuum drying apparatus; it has the same properties as the preparation described in Example 1.

*Example 3.*

20 gm. of a dried alcoholic extract of powdered bulbus Scillæ are dissolved in 2 liters of 40 per cent alcohol. The solution is mixed with 25 c. cm. of plumbum subaceticum duplex. It is filtered and the precipitate is washed with 500 c. cm. of 40 per cent alcohol. The filtrate is treated with 30 c. cm. of a tepid solution of 30 per cent by weight di-sodium phosphate to be freed from lead, filtered and the precipitate is washed with 500 c. cm. of 40 per cent alcohol. The filtrate is concentrated in vacuo to 250 c. cm., the solution so concentrated is saturated with common salt and the pure glucoside is produced as in Examples 1 and 2.

*Example 4.*

20 gm. of a dried alcoholic extract of powdered bulbus Scillæ especially rich in glucoside are dissolved in 200 c. cm. of methyl alcohol. Into the methyl alcoholic solution 600 c. cm. of ether are introduced and stirred. The precipitate is filtered and washed with the mixture ether-methyl alcohol (3:1) until the filtrate is free from active matters. The filtered solution is concentrated to dryness in vacuo. The residue (12 gm.) is dissolved in 1 liter of 40 per cent alcohol and 40 c. cm. of plumbum subaceticum duplex are added to the solution. The precipitate is filtered and washed with 400 c. cm. of 40 per cent alcohol. The lead is precipitated from the filtrate with 50 c. cm. of a tepid solution of 30 per cent by weight di-sodium phosphate. The lead precipitate is filtered off, and the precipitate is washed with 500 c. cm. of 40 per cent alcohol and the filtrate is concentrated to 200 c. cm. in vacuo below 30°. By the use of suitable parent materials up to ⅔ of the whole amount of glucoside separates itself in granular form. The separated material is collected by filtration, frequently washed on the filter with a little cold water and dried in the vacuum drying apparatus. The preparation is a white powder, which has the same properties as the product resulting from the above described Example 1. The part of the glucoside remaining in solution can be recovered, as shown in the other examples.

What we claim is:

1. A process for the manufacture of heart-affecting pure glucoside from bulbus Scillæ, consisting in dissolving in a watery solvent extracts obtained in the known way by exhaustive extraction of powdered squill rich in glucoside with a suitable organic solvent of small water content, mixing this solution with tannin precipitating substances, filtering off from the precipitate, removing from the filtrate any excess of tannin precipitating substance, treating the thus purified glucoside solution with an organic solvent not miscible with water, removing therefrom the glucoside by again treating with a sufficient quantity of water, and concentrating the watery solution in vacuo to dryness at low temperature.

2. A process for the manufacture of heart-affecting pure glucoside from bulbus Scillæ, consisting in dissolving in a watery solvent extracts obtained from powdered squill rich in glucoside by means of organic solvents of small water content, mixing this solution with tannin precipitating substances, filtering off from the precipitate, removing from the filtrate any excess of tannin precipitating substance, concentrating the purified glucoside solution in vacuo at low temperature and adding common salt, treating the mass with an organic solvent not miscible with water, removing therefrom glucoside by again treating with a sufficient quantity of water, and concentrating the watery solution in vacuo to dryness at low temperature.

3. A process for the manufacture of heart-affecting pure glucoside from bulbus Scillæ, consisting in dissolving in a water-containing organic solvent extracts obtained from powdered squill rich in glucoside, mixing this solution with tannin precipitating substances, filtering off from the precipitate, removing from the filtrate any excess of tannin precipitating substance, concentrating the separated glucoside solution in vacuo at low temperature, adding common salt thereto, shaking with chloroform containing methyl alcohol, removing therefrom the glucoside by again treating with a sufficient quantity of water and concentrating the solution in vacuo to dryness at low temperature.

4. A process for the manufacture of heart-affecting pure glucoside from bulbus Scillæ, consisting in preliminarily treating extracts obtained from powdered squill rich in glucoside by means of organic solvents of small water content with a methyl alcoholic solution of ether, concentrating and dissolving the same in a watery solvent, then mixing this solution with tannin precipitating substances, filtering off from the precipitate, removing from the filtrate any excess of tannin precipitating substance, concentrating the thus purified glucoside solution first in vacuo at low temperature for a primary separation of glucoside and then treating same with an organic solvent not miscible with water to secondarily remove all of the remaining glucoside by again treating with a sufficient quantity of water, and concentrating this watery solution in vacuo to dryness at low temperature.

5. As new article of manufacture, the pure glucoside obtained from bulbus Scillæ as hereinbefore described, constituting a white to slightly yellowish powder free from ash, unable to reduce even in concentrated solution Fehling's solution, having a high physiological efficacy, giving according to the Frog standard of Houghton-Straub 1200 to 1300 Frog doses by 1 mg. of substance, showing a decrease of efficacy in watery solution at higher temperature already after short time, being hydrolized even in the cold by dilute watery acids into sugar reducing Fehling's solution and into a fairly crystallized division product almost insoluble in water.

In witness whereof we have hereunto signed our names this 25th day of May, 1923, in the presence of two subscribing witnesses.

ARTHUR STOLL.
EMIL SUTER.

Witnesses:
AMAND BRAUN,
LUCIEN PICARD.